Patented June 27, 1944

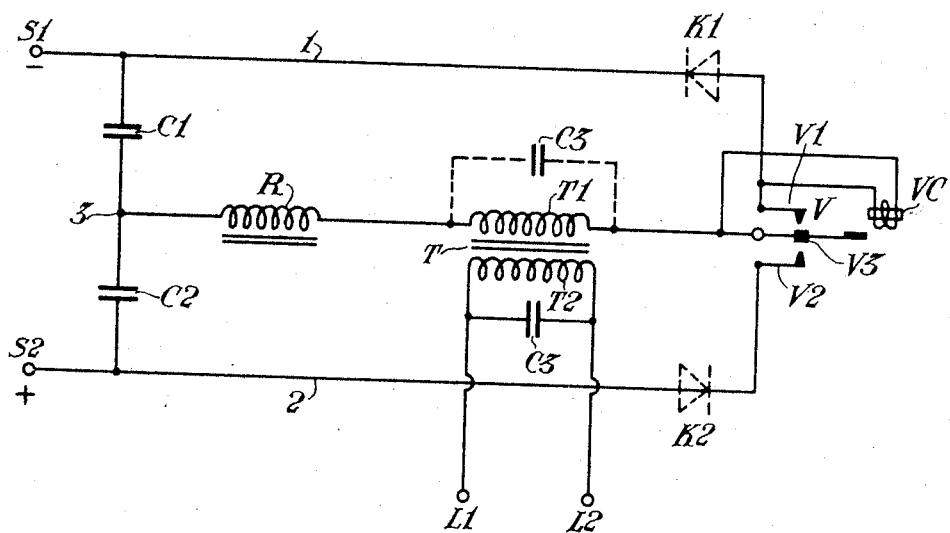

2,352,299

UNITED STATES PATENT OFFICE 2,352,299

APPARATUS FOR THE CONVERSION OR INVERSION OF DIRECT ELECTRIC CURRENT TO ALTERNATING CURRENT

Alec Hervey Bennett Walker, King's Cross, London, England, assignor, by mesne assignments, to The Union Switch & Signal Company, Swissvale, Pa., a corporation of Pennsylvania Application March 17, 1942, Serial No. 435,074
In Great Britain September 24, 1940

1 Claim. (Cl. 175—365)

This invention relates to apparatus for the conversion or inversion of direct electric current to alternating current of the kind comprising a vibrating or oscillating element adapted during its operation alternately to connect a circuit including a condenser and a reactance to the source of direct current and to close this circuit on itself. The circuit is thus alternatively traversed by current in opposite directions as the condenser is charged and discharged and this alternating current is transmitted to the alternating current load through a transformer the primary winding of which is included in the condenser circuit and the secondary winding in the load circuit.

In this type of inverter apparatus the electrical characteristics of the condenser and the reactance can be so determined that for a given load the disconnections of the condenser circuit from the direct current source and the interruption of the closed circuit condition of this circuit effected by the vibrating element can be arranged to occur at times when the current traversing the circuit is substantially zero, viz. when the condenser is fully charged and discharged respectively. As a result, sparking at the contacts operated by the vibrating element is substantially eliminated.

The apparatus above described is however open to the disadvantage that these sparkless conditions of operation are only obtained for a particular load and the present invention has for its object to provide certain improvements whereby sparking at the vibrator contacts is substantially eliminated over a relatively wide range of load while an alternating voltage of approximately sine wave form is impressed upon the load circuit.

According to one feature of the invention the effective inductance of the reactance connected in the condenser circuit or the inductance of the primary winding of the transformer or both is automatically variable as the current in the condenser circuit varies with variations of load in such a manner as to compensate for the corresponding changes in the condenser charge and discharge current curves as the load increases so that for any load within a relatively wide range the interruption of the condenser circuit will take place without appreciable sparking at the contacts.

The primary or secondary winding of the transformer may be provided with a condenser connected in parallel therewith, the electrical characteristics of this condenser being so determined that the condenser and transformer winding constitute a circuit which is substantially resonant at the frequency of oscillation of the vibrating element of the apparatus.

In carrying the invention into practice two circuits each containing a condenser and the primary winding of the transformer are provided each of these circuits being alternately connected to the direct current source by the operation of the vibrating element so as to charge the condenser in this circuit while the other circuit is simultaneously closed upon itself through the primary winding of the transformer.

The invention is illustrated by way of example in the accompanying drawing the single figure of which is a diagrammatic view of a preferred form of apparatus embodying the invention.

Referring now to the drawing it will be seen that two condensers C1, C2 of suitable capacity are shown as connected in series with one another across the terminals S1, S2 of the source of direct current, the terminal S1 being also connected through a conductor 1 to the fixed contact V1 of the vibrating device V and the terminal S2 through a conductor 2 to the other fixed contact V2 of the device V. The latter is of the vibrating reed type comprising a contact element adapted to vibrate between the two fixed contacts V1 and V2 so as alternately to effect electrical contact therewith under the action of an energizing coil VC the terminals of which are connected to the contacts V1 and V3. The point 3 intermediate the series connected condensers C1 and C2 is connected in series with a reactance R and the primary winding T1 of an output transformer T to the vibrating contact element V3.

A suitable condenser C3 is connected in parallel with the secondary winding T2 of the transformer T the capacity of the condenser C3 being such that the output wave form is substantially of sine wave form. The condenser C3 may if desired be connected in parallel with the primary winding T1 of the transformer T as shown in dotted lines and the terminals of the secondary winding T2 are connected to the load or output terminals L1, L2 of the apparatus.

The output transformer T is so designed as to have an automatically variable inductance i. e. its inductance decreases somewhat rapidly as the voltage applied to the transformer winding T1 increases due to the reduction in the permeability of the magnetic core of the transformer with increase of flux density.

The operation of the apparatus is as follows:

Assuming that the contact member V3 of the vibrating reed device V is arranged as shown to oscillate in a vertical plane, when the contact member V3 is in its lower position in engagement with the corresponding lower contact V2 of the device, a current will flow from the positive terminal S2 of the direct current source through the conductor 2, the lower fixed contact V2, the vibrating contact V3, the primary winding T1 of the output transformer T, the reactance R, and condenser C1 to the negative terminal S1 of the direct current source. The condenser C1 is thus charged, the charging current, which in the usual manner varies as the condenser becomes charged, traversing the primary winding T1 of the transformer T in what may be termed the positive direction. In this position of the vibrating contact V3 it will be seen that the other condenser C2 which had been previously charged is connected in a closed circuit including the reactance R, the primary winding T1 of the transformer T, the contacts V3 and V2 of the reed device V and conductor 2. The condenser C2 thus discharges through this closed circuit the discharge current also traversing the primary winding T1 of the transformer T in the positive direction.

When the vibrating contact V3 of the reed device V now moves to its upper position, current will flow from the positive terminal S2 through condenser C2, the reactance R, the primary winding T1 of the transformer T in the reverse or negative direction, the vibrating contact V3, and the upper fixed contact V1 of the reed device V through the conductor 1 to the negative terminal S1. In this position of the vibrating contact V3 the now charged condenser C1 is connected in a closed circuit including the primary winding T1 of the transformer T so that the discharge of the condenser C1 traverses the transformer winding T1 in the negative direction.

The primary winding T1 of the output transformer T is thus traversed by currents in opposite directions alternatively and induces a corresponding alternating current voltage at the terminals of the secondary winding T2 of the transformer T which are connected to the load terminals L1, L2.

Since the action of the apparatus above described tends to cause a reversal in the flow of current in the transformer circuit at very light loads before the circuit is opened, rectifiers K1, K2 (as shown in dotted lines) may be included in the circuits of the conductors 1, 2 leading to the fixed contacts V1, V2 so as to prevent the actual flow of current in the reverse direction.

In an alternative form of apparatus the reactance R connected in the circuit of the primary winding T1 of the output transformer T is so designed that its inductance varies automatically as the voltage across its terminals varies due to changes in the permeability of the core of the reactance.

In a still further form of apparatus the reactance R, and if desired, the condenser C3 may be omitted.

In the event of the vibrating device V ceasing to operate with its vibrating element V3 in engagement with one of the fixed contacts V1, V2 the corresponding condenser C2 or C1 will prevent a short-circuit across the terminals S1, S2 of the direct current source.

It will be understood that under certain conditions the reactance R and the transformer T may be embodied in the same core assembly in the manner of a three-limbed leakage reactance transformer.

The frequency of the alternating current supplied by the apparatus of the invention may evidently be determined by the natural frequency of the reed element in cases in which a vibrating device of the reed type is employed or the frequency may be otherwise determined as, for example, by supplying the energizing member of the vibrating device with operating current from any suitable source of alternating current of the desired frequency of alternation.

In these and other respects the invention is evidently not limited to the particular arrangements above described and illustrated by way of example.

Having now described my invention, what I claim as new and desire to secure by Letters Patent is:

Apparatus for the conversion of direct electric current into alternating current comprising in combination, a first condenser, a second condenser, a first half wave rectifier, a second half wave rectifier, a reactor, a transformer, and a vibrating element having a first and a second contact which close alternately, said transformer having an output winding which is connected to a load circuit; a first circuit including said first condenser, said reactor, the input winding of said transformer, said first rectifier, and said first contact of the vibrating element; and a second circuit including said second condenser, said reactor, said input winding, said second rectifier, and said second contact of the vibrating element; said first contact being effective for charging said first condenser from the direct current source through said first rectifier and said input winding in a given direction which is the low resistance direction for said first rectifier and for discharging said second condenser through said first rectifier and said input winding in said given direction, said second contact being effective for charging said second condenser from the direct current source through said input winding in the opposite direction and through said second rectifier in the low resistance direction for that rectifier and for discharging said first condenser through said input winding in said opposite direction and the low resistance direction of said second rectifier, whereby the alternating closing of said first and second contacts causes an alternating current to be induced in said output winding and whereby a premature reversal of current in said input winding before said contacts are opened encounters the high resistance of said first or said second rectifier.

ALEC HERVEY BENNETT WALKER.